US008498756B1

(12) United States Patent  
Sarver

(10) Patent No.: US 8,498,756 B1  
(45) Date of Patent: Jul. 30, 2013

(54) MOVABLE GROUND BASED RECOVERY SYSTEM FOR REUSEABLE SPACE FLIGHT HARDWARE

(75) Inventor: George L. Sarver, Sunnyvale, CA (US)

(73) Assignee: The United States of America as Represented by the Adminstrator of the National Aeronautics & Space Administration (NASA), Washington, DC (US)

( * ) Notice: Subject to any disclaimer, the term of this patent is extended or adjusted under 35 U.S.C. 154(b) by 111 days.

(21) Appl. No.: 13/213,022

(22) Filed: Aug. 18, 2011

(51) Int. Cl.
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................................................. 701/1

(58) Field of Classification Search
USPC .................................. 701/1; 244/158.1, 158.9
See application file for complete search history.

(56) References Cited

U.S. PATENT DOCUMENTS

| 2,923,504 | A | * | 2/1960 | Ortega et al. | ............. 244/114 R |
| 3,093,346 | A | | 6/1963 | Faget et al. | |
| 3,132,825 | A | | 5/1964 | Postle et al. | |
| 3,310,261 | A | | 3/1967 | Rogallo et al. | |
| 3,532,179 | A | | 10/1970 | McCreary | |
| 3,702,688 | A | | 11/1972 | Faget et al. | |
| 5,064,151 | A | * | 11/1991 | Cerimele et al. | ........... 244/172.1 |
| 5,522,470 | A | | 6/1996 | Stiegler et al. | |
| 7,392,964 | B1 | * | 7/2008 | Anderman | ................. 244/158.2 |
| 7,650,253 | B2 | | 1/2010 | Weed et al. | |
| 2002/0035419 | A1 | * | 3/2002 | Lin | .................................. 701/27 |
| 2007/0012820 | A1 | | 1/2007 | Buehler | |
| 2007/0016371 | A1 | * | 1/2007 | Waid et al. | ..................... 701/213 |
| 2010/0052948 | A1 | | 3/2010 | Vian et al. | |
| 2011/0017872 | A1 | | 1/2011 | Bezos et al. | |

FOREIGN PATENT DOCUMENTS

EP 09167658.5 A2 2/2010

OTHER PUBLICATIONS

NASA—Resusable Solid Rocket Motor and Solid Rocket Boosters, Jeane Ryba, Dec. 10, 2009.*
Johnson, Handbook of Soviet Manned Space Flight, 1980, 119-122, Univelt, Inc., San Diego, California.
Gaubatz, DC-X Results and the Next Step, Proceedings of AIAA Space Programs and Technologies Conference and Exhibit, Sep. 27-29, 1994, Huntsville, Alabama, AIAA, Washington, D.C.

* cited by examiner

*Primary Examiner* — Mary Cheung
*Assistant Examiner* — Frederick Brushaber
(74) *Attorney, Agent, or Firm* — John F. Schipper; Robert M. Padilla; Christopher J. Menke

(57) ABSTRACT

A reusable space flight launch system is configured to eliminate complex descent and landing systems from the space flight hardware and move them to maneuverable ground based systems. Precision landing of the reusable space flight hardware is enabled using a simple, light weight aerodynamic device on board the flight hardware such as a parachute, and one or more translating ground based vehicles such as a hovercraft that include active speed, orientation and directional control. The ground based vehicle maneuvers itself into position beneath the descending flight hardware, matching its speed and direction and captures the flight hardware. The ground based vehicle will contain propulsion, command and GN&C functionality as well as space flight hardware landing cushioning and retaining hardware. The ground based vehicle propulsion system enables longitudinal and transverse maneuverability independent of its physical heading.

19 Claims, 5 Drawing Sheets

MOVABLE GROUND BASED RECOVERY SYSTEM FOR REUSEABLE SPACE FLIGHT HARDWARE

ORIGIN OF THE INVENTION

This invention was made, in part, by one or more employees of the U.S. government. The U.S. government has the right to make, use and/sell the invention described herein without payment of compensation, including but not limited to payment of royalties.

TECHNICAL FIELD OF INVENTION

An aspect of this invention relates generally to a low-cost reusable space launch system, and more particularly to a system featuring a distributed approach to configure key elements of the landing system, including guidance, navigation and control, where an actively controlled ground vehicle is used in an innovative manner to recover flight hardware such as a spacecraft or launch booster.

BACKGROUND OF INVENTION

In theory, a design incorporating a reusable spacecraft or booster can significantly reduce the cost of access to space. In order to realize these theoretical benefits, the launch vehicle must satisfy two design elements: 1) substantial elements of the launch vehicle and spacecraft must be reusable (either in full or in component) and 2) as costs scale with system size and complexity, the launch vehicle must be as small and simple as practicably possible.

Reusable suborbital or orbital flight hardware has been traditionally configured following two approaches. The first is to fit the reusable hardware with a precision landing system. The second is to fit the reusable hardware with a simple parachute and allow the hardware to fall to the surface. The Space Shuttle Orbiter is an example of the first approach to reusability. The orbiter features wings and landing gear; it glides to land on a long, but otherwise conventional runway. The Space Shuttle Solid Rocket Motors are an example of the second approach to reusability. After their fuel is expended, they fall into the ocean by parachute where they are later recovered.

Present approaches to reusable spacecraft and booster design do so at great impact to vehicle design. The inherent physics of a launch vehicle results in a system where only a few percentage points of the total gross-lift-off-weight are available for payload. (For example, the Space Shuttle has a net payload of less than 1.22% of its total gross-lift-of-weight). Any increase in fixed weight on the orbital or suborbital elements of a launch vehicle must be accounted for by a reduction in payload capability or an increase in the overall size of the system.

For a fixed size launch vehicle, with a small payload fraction, even a small percentage point increase in fixed weight among the heavier booster elements will radically reduce the launch vehicle's payload capacity.

For a conceptual launch vehicle, flying a design payload along an equivalent trajectory, these weight penalties of reusable systems will increase the gross-lift-off-weight in a multiplicative, rather than additive fashion.

Typical reusable technologies to enable a precision landing system (lifting bodies or wings) weigh considerably more than reusable technologies that lack precision landing capability (parachutes).

Without precision landing capabilities, reusable spacecraft and boosters are typically retrieved at sea. A water landing, resulting in salt-water immersion of space flight hardware, is detrimental to the reusability of complex space flight hardware. After an ocean recovery, only the casings of the Space Shuttle Solid Rocket Boosters can be reused. The boosters must be otherwise re-manufactured. For example, all electronics, having been exposed to the corrosive salt-water environment, must be replaced at considerable expense.

A method to ensure precision landings of reusable space launch flight hardware (either spacecraft of boosters) that would distribute heavy elements of recovery, propulsion, guidance, navigation and control to non-flight hardware could enable a radical reduction in the size, complexity and hence cost, of hardware used to launch payloads into space.

The design of recoverable and reusable spacecraft or launch vehicle (space flight hardware) elements has been well established in practice.

In U.S. Pat. No. 3,093,346, entitled "Space Capsule," Faget illustrates a means to employ a parachute to enable the intact recovery of a returning spacecraft. A parachute is an embodiment of a concept of a lightweight, deployable membrane that provides only drag. A parachute is used to enable ballistic recovery of an object.

In U.S. Pat. No. 3,310,261, entitled "Control for Flexible Parawing," Rogallo and Sleeman illustrate the evolution of a simple parachute into a parafoil. A parafoil is an embodiment of a concept of a lightweight, deployable membrane wing that can produce lift, drag and stabilizing forces and moments. A parafoil is used to enable the gliding recovery of an object.

The McDonnell Douglas DC-X (see: "DC-X Results and the Next Step," AIAA 94-4674 demonstrated a concept for a reusable spacecraft using a retro-rocket system. The retro-rocket is used in lieu of a parachute to facilitate precision guidance, navigation and control for a soft landing. The DC-X featured space flight hardware where the engine is deployed and restarted after atmospheric reentry. The thrust from the engine is used to decelerate and orient the flight hardware vertically. With the rocket firing, the vehicle will then execute a precision vertical landing onto a specific landing site.

In U.S. Pat. No. 3,132,825, entitled "Space Atmosphere Vehicle," Postle illustrates the recovery of a spacecraft or launch vehicle element through shaping of the overall configuration into a lifting body. The lifting body is an embodiment of a concept of a rigid aeroshell with surface detailing that produces lift, drag and other stabilizing forces and moments.

In U.S. Pat. No. 3,702,688, entitled "Space Shuttle Vehicle and System," Faget teaches a more conventional approach to recovery. As found on the Space Shuttle Orbiter, this approach embodies wings and tail surfaces incorporated into the reusable flight hardware. This permits the flight hardware to glide to a landing on a conventional runway.

Examples of prior art configuration generally used to prevent a returning spacecraft lacking precision landing capabilities from destructive impact with the ground include 1) landing in water (Faget: U.S. Pat. No. 3,093,346 see above), 2) air capture using a airplane or helicopter (Mulcahy: U.S. Pat. No. 3,137,465), and 3) firing retro rockets just prior to impact (see a description of the Soyuz capsule in Handbook of Soviet Manned Space Flight, p. 119-121, ISBN 0-08803-115). In the former, the flight hardware is immersed in salt water making the design of a reusable spacecraft much more complex and heavy. In air capture, the relative size of an aircraft or helicopter to the returning flight vehicle limits its use to small capsules. This technique also is not compatible with large flight vehicles due to the potential of failed capture causing the loss of the parachute and uncontrolled descent into the ground. Retro-rockets and air bags are used to cushion the landing of the flight vehicle. In these systems, the rockets or air bags add significant weight to the flight hardware and typically do not compensate for any lateral motion at landing causing significant side loads and a possibility of roll over at landing. This leads to increased structural mass of the vehicle.

Airborne recovery of spacecraft is a hazardous operation and is not suitable for manned flight vehicles. Air capture of a returning spacecraft can cause the loss of the parachute system in a failed capture event; the spacecraft would then fall to ground at a high velocity.

A ground based recovery system that occurs at zero altitude can be man rated.

Examples of prior art configurations involving a sea based recovery platform coupled with a retro-rocket technology precision vertical landing flight hardware includes US Patent Application 2011/0017872, "Sea landing of space launch vehicles and associated systems and methods." Here, Bezos describes a spacecraft recovery system comprising a ship fitted with a landing surface that is pre-positioned in the general reentry region. The reusable flight hardware elements, after re-entry, reorient themselves tail first, and perform a powered, vertical landing upon the ship mounted platform.

U.S. Pat. No. 2,923,504 ("Safety Landing Platform for Aircraft," Ortega and Wallace) teaches that a system comprising an energy absorbing landing platform attached to a moving ground based vehicle may be used to simplify the landing gear design of an airplane. While this patent describes a vehicle that is in motion at the time of capture, the wheeled has only limited steering capability.

Hovercraft are air cushion vehicles, employing the principle of aerodynamic levitation of a structure above a surface. McCreary in U.S. Pat. No. 3,532,179, entitled "Aerodynamic Lifting Device and Method of Lifting," where the air cushion is formed by means of a flexible, pneumatically stabilized diaphragm underlying the vehicle, teaches the design principles of a modern hovercraft.

All of the above references are hereby incorporated by reference.

SUMMARY OF INVENTION

An aspect of the invention is a method for capturing reusable space flight hardware that passes through an atmosphere in an approach to a terrestrial surface with a general landing region identified on the terrestrial surface in which the space flight hardware will land. One or more ground based vehicles that are movable and maneuverable are pre-positioned in the general landing region. The space flight hardware has an atmospheric deceleration system that when activated allows the space flight hardware to descend in reaction to aerodynamic and gravitational forces acting upon the space flight hardware and the deceleration system. The absolute and relative positions of the space flight hardware and the ground based vehicle are measured and the trajectory of the space flight hardware is estimated as it descends. The ground based vehicle is maneuvered using the measured absolute and relative positions and the estimated trajectory to capture the space flight hardware. In one embodiment, the components of a recovery guidance, navigation and control are located on the ground based vehicle system rather than on the space flight hardware.

Another aspect of the invention is drawn to a hovercraft used to capture and recover space flight hardware that passes through an atmosphere in an approach to a terrestrial surface. The hovercraft includes a surface effect levitation system comprising one or more flexible skirts and a pressurization mechanism and a landing platform to mechanically capture the space flight hardware. The hovercraft propulsion system is capable of maneuvering the hovercraft in forward/aft translation, left/right translation and directional rotation (compass heading) independently of each other. Additionally, guidance, navigation and control (GN&C) hardware located on the hovercraft that directs motion of the hovercraft to maneuver itself beneath the descending space flight hardware, substantially matching the space flight hardware speed and direction when the landing platform captures the space flight hardware.

DETAILED DESCRIPTION

Figure 1:
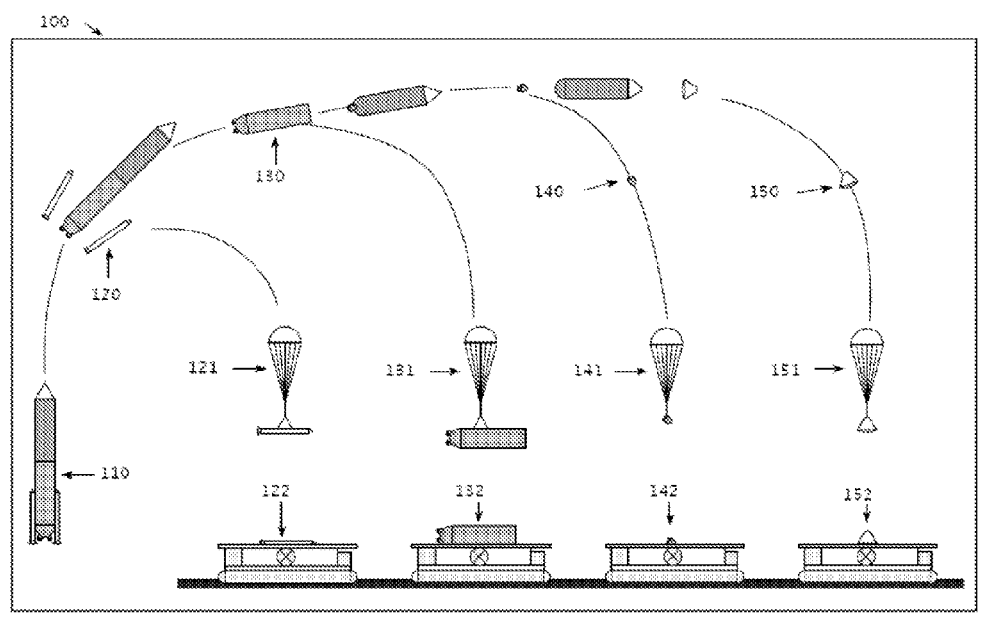
FIG. 1 is a schematic diagram illustrating the overall mission profile of a reusable space launch system where reusable booster and spacecraft elements are recovered using a translating ground based recovery system.

FIG. 1 shows a reusable space launch vehicle system 100 where significant elements of the launch vehicle 110 and spacecraft 150 are reusable. The reusable launch vehicle may comprise a fully reusable solid rocket booster 120, a fully reusable liquid rocket booster 130, or a partially reusable liquid rocket booster featuring a jettisonable engine pod 140.

In order to reduce the complexity of each reusable space flight hardware element, their respective recovery system will omit elements of guidance, navigation and control (GN&C) capability used for precision landing. Because any increase in the empty weight of a rocket launch system materially diminishes from its payload capability, a simple, lightweight landing parachute system to a heavier aerodynamic (wings) or propulsion (retro-rocket) based approach. Every electromechanical component required for active recovery guidance, navigation and control (GN&C) requires power. Electronics, batteries and actuators displace volume that could otherwise be used for fuel. Consequently, a design that relocates components typically found on board the space flight article to a ground based vehicle leaving only a passive parachute, will have a multiplicative effect in decreasing the complexity and weight of the booster or spacecraft. The word "ground" as generally referred to herein is intended to include both land and sea. A hovercraft, while typically operated at sea, could perform its recovery mission on land given a wide expanse of smooth, flat terrain.

Capture and recovery of these flight hardware elements will be affected by one or more translating ground based recovery vehicles 122, 132, 142 and 152. These vehicles will allow the reusable flight hardware to have a dry recovery at sea; no portion of the flight hardware will ever become immersed in seawater. The protection of the flight hardware from the corrosive effects of submersion enhances reusability of all components. In addition, this means of cushioned landing is safer for any returning astronauts on board a spacecraft.

For example, a reusable solid rocket booster 120 will be fitted with a deployable parachute or parafoil 121, suitable to decelerate it to a sufficiently low vertical velocity to affect recovery using the ground based landing system 122 without mechanical damage.

For example, a reusable liquid rocket booster 130 will be designed to return to the earth's surface without damage. The booster 130 also will be fitted with deployable parachute or parafoil 131, suitable to decelerate it to a sufficiently low vertical velocity to affect recovery using the ground based landing system 132 without mechanical damage.

For example, reusable components (such as an engine pod) from an upper stage liquid rocket booster 140 may be jettisoned from the upper stage. These components will be designed to return to the earth's surface without damage. The engine pod 140 also will be fitted with deployable parachute or parafoil 141, suitable to decelerate it to a sufficiently low vertical velocity to affect recovery using the ground based landing system 142 without mechanical damage.

For example, a reusable or recoverable spacecraft 150 will be designed to reenter the earth's atmosphere without damage. The spacecraft 150 also will be fitted with deployable parachute or parafoil 151, suitable to decelerate it to a sufficiently low vertical velocity to affect recovery using the landing system 152 without mechanical damage.

For each booster or spacecraft element to be recovered, the system will employ one or more translating ground based recovery systems. For example, 1) the reusable solid rocket booster 120 will be associated with a ground recovery system 122, 2) the reusable liquid solid rocket booster 130 will be associated with a ground recovery system 132, 3) the reusable upper stage components 140 will be associated with a ground recovery system 142, and 4) the reusable spacecraft 150 will be associated with a ground recovery system 152. These systems 122, 132, 142 and 152 may be comprised of similar or different embodiments of this invention.

An embodiment of the present invention features a translating ground based recovery system 122, 132, 142 and 152, which may comprise one or more hovercraft, or other surface vehicle, having active speed and direction control capability capable of rapid longitudinal and transverse motion upon either land or water.

Current hovercraft have been configured to have their principal propulsion system oriented to provide thrust along a dominant axis. Thrust vectoring is typically used to alter vehicle heading, rather than provide direct side force control. Thus conventional hovercraft design practice results in a vehicle that is "steered" to control position and heading in a manner consistent with a ship. However, the hovercraft principle is amenable to fitment of propulsion devices where axial and transverse thrust is directly controlled independently of the heading. With such a propulsion configuration, the hovercraft could be commanded to "crab" in translation independent of the compass heading of its structure. The propulsion system required to enable this capability will be described later.

Production hovercraft have been built in a wide variety of sizes and configurations. Commercially produced hovercraft have been engineered to operate at a maximum continuous speed of over 80 knots. Hovercraft with this speed capability have been constructed at sizes exceeding 500 tons and 150 feet in overall length. A larger hovercraft may be desirable for capture of the largest or most critical flight hardware elements. A smaller hovercraft, of a size equivalent to the production LCAC (built by Textron for the US Navy) may prove desirable. The LCAC (180 tons overall, 150,000 pound payload, and 87 foot overall length) integrates its operations with US Navy operated amphibious well deck ships.

Current production hovercraft have been engineered to operate successfully under conditions up to Sea State 4. This sea state implies the vehicle will operate in the presence of significant waves as high as 6 feet, with the occasional 9 foot wave. Current production hovercraft have been sized for relatively short range operations, with advertised ranges of 300 to 400 nautical Miles.

The ground based recovery system 122, 132, 142 and 152, comprises a heterogeneous redistribution of systems design elements. The heavy, complex and propulsive elements are allocated to the ground based hardware leaving only lightest weight and simplest elements on the flight hardware. This fractionated approach to systems design reduces the weight and complexity of the flight hardware. For equivalent payload capability, the reduction in weight and complexity of the booster or spacecraft combined with its multiplicative effect upon vehicle sizing will result in a smaller, lighter and less complex space launch system.

Figure 2:
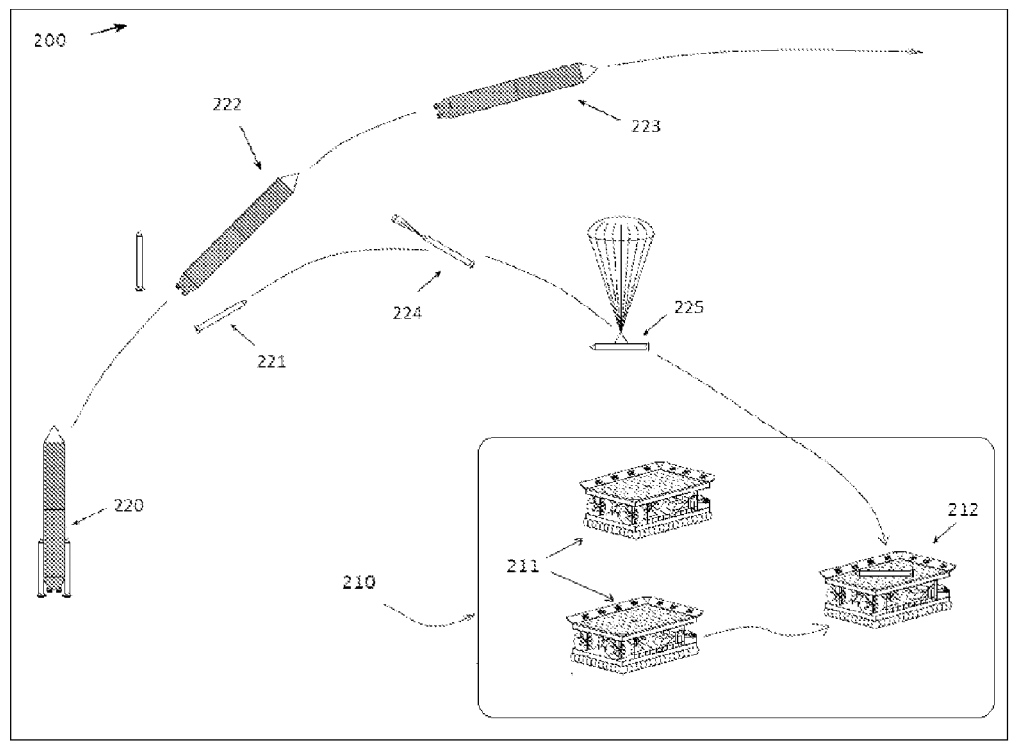
FIG. 2 is a schematic diagram illustrating the terminal mission profile of a reusable space launch system where reusable booster and spacecraft elements are recovered using a translating ground based recovery system.

FIG. 2 shows a recovery scenario in 200. Operationally, one or more ground based recovery systems 211 would be pre-positioned into the general landing area prior to launch or reentry 210. While only one ground based vehicle would affect the actual capture of the flight hardware, in the event of high winds or speed limiting surface conditions, multiple ground based systems can be employed to recover systems that have a large landing error ellipse. Under unfavorable conditions, it is foreseeable that a single recovery system might be unable to capture the target.

The reusable launch vehicle 220 will be launched. Upon burnout, the elements to recover will be jettisoned 221 from the remainder of the launch vehicle 222. The upper stage elements 223 will continue in flight.

The reusable flight hardware will approach the surface in reaction to aerodynamic and gravitational forces acting upon it.

During re-entry, the flight hardware would follow an essentially ballistic trajectory.

The reusable flight hardware would activate the deceleration system at an appropriate time during descent, deploying the aerodynamic device 224. The parachute, parafoil or other aerodynamic device when fully deployed will decelerate the booster or spacecraft to a low vertical speed.

After this time, the trajectory of the flight hardware becomes dominated by aerodynamic forces where atmospheric winds interact with the aerodynamic deceleration device.

The parachute or parafoil system associated with the flight hardware will be configured to orient the flight hardware in manner best suited to reduce landing loads. Because landing design loads typically influence the weight of the flight hardware, this attribute of the ground based recovery system will directly save structural weight on the flight hardware. The parachute might hold the solid rocket booster or other cylindrical flight hardware element in a near horizontal orientation 225.

The deceleration device need not provide any active steering or energy management capability. In one embodiment, only a passive parachute is needed; all other descent and landing systems have been transferred to ground based hardware. In another embodiment, a mixed system is envisioned where the majority of the descent and landing hardware is ground based, but the flight hardware retains limited steering or energy management systems. A system utilizing a parafoil would be an example of a system where the deceleration device has limited steering capability.

Lacking an active flight control system suitable for precision approach and landing, the flight hardware would descend to approach the surface where its trajectory will be influenced by external unsteady aerodynamic forces from atmospheric winds and turbulence.

Elements on-board the ground based recovery system 211 will measure the absolute and relative positions of the flight hardware and the ground vehicle. In one embodiment, position and velocity measurements can be made by the flight vehicle and transmitted to the ground vehicle. The GN&C system to estimate the trajectory of the flight hardware as it descends towards the ground. The GN&C system will then provide position automated guidance to the ground based vehicle based upon the estimated trajectory.

The ground based vehicle 210, using its propulsion and steering capability will position itself so that it is beneath and matching the ground speed and direction of the descending flight hardware as closely as possible at the moment of capture 212. This will minimize the relative velocities between the ground vehicle and the flight hardware ensuring the "softest" possible landing. The lateral relative velocities will be low, reducing the structural loads on the flight vehicle. Because landing design loads typically influence the weight of the space flight hardware, this attribute of the ground based recovery system can directly lead to lighter weight flight hardware.

The ground based vehicle will mechanically capture the descending spacecraft or booster using a passive or active capture mechanism.

Figure 3:
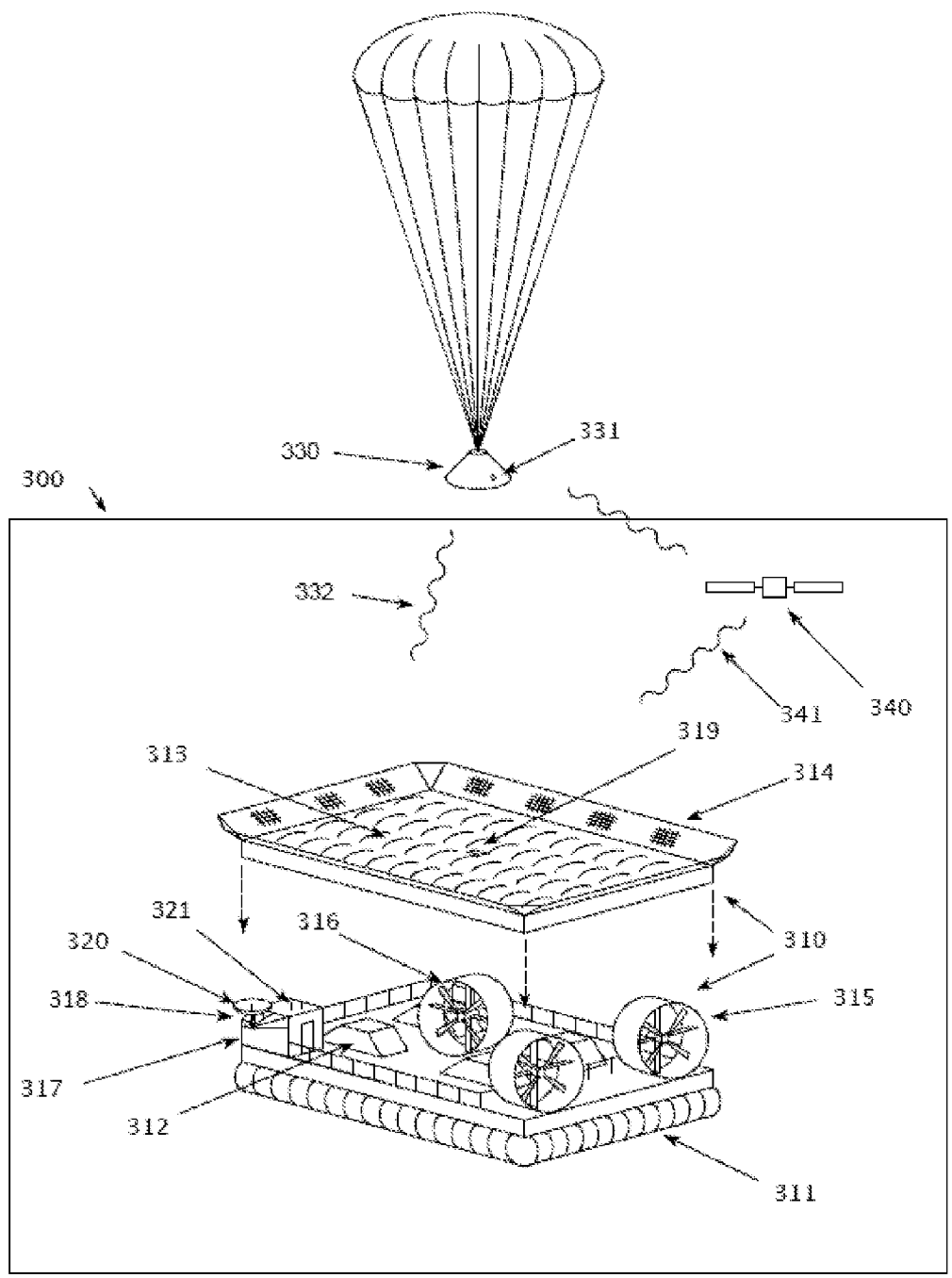
FIG. 3 is a schematic diagram illustrating the ground based recovery system including flight hardware recovery, propulsion, steering, command and GN&C elements.

As shown in FIG. 3, a ground based recovery system 300, embodied as a hovercraft 310, may be comprised of surface effect vehicle elements 311 and 312, flight hardware recovery elements 313 and 314, propulsion and steering elements 315 and 316, a command element 317 and a guidance, navigation and control (GN&C) element 318. These elements will be discussed in order.

To facilitate recovery, the ground vehicle should be highly maneuverable. Orientation and translational heading must be decoupled. Therefore, forwards/aft translation, left/right translation and rotation of hovercraft to different compass headings must be independently controllable. The recovery hovercraft 310 is an embodiment of a ground vehicle with high speed that can maneuver in translation and heading separately from rotation. The hovercraft will be controlled in physical heading and well as translational heading to orient its landing platform to match the principal longitudinal axis of the descending space flight hardware. This will align the center of mass of the flight hardware with the center of the landing platform. This procedure minimizes the chance that the space flight hardware overhangs the landing platform, and reduces any tendency for the hovercraft to roll or pitch due to the impact loading.

The recovery hovercraft 310 is embodied as comprising basic surface effect vehicle elements providing pressurization of one or more air cushions using a flexible pneumatically stabilized diaphragm 311, pressurized by one or more hover fans 312.

The ground based vehicle will mechanically capture the descending spacecraft or booster. The flight hardware recovery elements may comprise of a landing cushion 313 and recovery netting 314. In an embodiment, the landing cushion 313 would utilize pneumatic mechanisms to absorb energy. However, other forms of cushioning or netting may be used to absorb energy during capture. The side recovery netting will prevent the flight hardware from falling overboard after capture. A passive system may comprise energy absorbing surfaces and retaining netting. An active system may comprise elements such as controllable pneumatic air bags. Pneumatic air bags, netting and cabling will secure the flight hardware after landing.

The cushioned landing platform will reduce landing loads on the recovered booster or spacecraft 330. The capture mechanism can prevent the flight hardware from rolling over or skidding at landing.

The primary propulsion elements 315 and 316, may be embodied by a system comprising of one or more vectored thrust propulsors and/or discrete orthogonally configured propulsors. This design permits the hovercraft ground vehicle to operate at high speeds (above 70 knots) and allows it to maneuver in two orthogonal transverse directions without the need to "steer" in rotation. Conventional practice fits the vectored thrust propulsors at one end that permits the hovercraft to move forwards and aft and to steer in direction. However, conventional practice does not permit yawing moments to be decoupled from longitudinal and transverse forces. With multiple propulsors, the hovercraft is capable of maneuvering in forward/aft translation, left/right translation and yaw independent of each other. Such a propulsion configuration will also permit the hovercraft to be conventionally "steered" to a specific heading.

The command element 317 may comprise of fully automatic, electronic system or may include a human operator as an on-board or remote pilot. The command element will coordinate the overall operation of the hovercraft. It will coordinate and direct the operation of the hovercraft when it is not being used to effect capture of flight hardware. During the hardware capture process, the command element will coordinate any active recovery cushioning 313 or netting 314 functionality as well as propulsion 315 and 316 and GN&C elements 318.

The GN&C system 318 may comprise elements that will determine the absolute and relative positions of the descending flight hardware and the ground based recovery system. The GN&C system may be comprised of elements that: 1) estimate the present and future location of the ground based recovery system, 2) estimate the present and future location of the descending flight hardware, 3) compute speed and direction necessary to ensure that the ground based recovery system is beneath the flight hardware with minimal relative motion at the moment of capture.

The GN&C system 318 will infer real-time descent trajectories of the flight hardware resulting from atmospheric winds. The GN&C system will be comprised of a number of distinct elements, with relatively few, if any, elements placed on-board the flight hardware.

In an embodiment, GN&C elements include those that optically 319 estimate the location and trajectory of the descending flight hardware 330. Electro-optical trackers and seekers use ambient visible light to locate the flight hardware.

GN&C elements may also comprise a RADAR system 320 to estimate the location and trajectory of the descending flight hardware 330. RADAR uses actively generated radio frequency signals to locate the flight hardware.

GN&C elements may also comprise a global positioning system (GPS) receiver 321 on board the ground based recovery system to infer positions from global positioning system satellites 340 that broadcast signals 341.

GN&C elements may also comprise a global positioning system (GPS) receiver 331 and active transponder 332 on the flight hardware to estimate its location and transmit that information to the ground based recovery system 300.

Knowledge of the absolute and relative positions of the descending flight hardware and the ground based recovery system will allow the GN&C system to infer the basic trajectory as well as the effects of atmospheric winds upon the present and future location of the descending flight hardware. This information can be utilized by the command guidance algorithm in the GN&C system in order to affect capture of the flight hardware.

The recovery hovercraft 310 is sized to be large enough to capture the returning flight hardware. As noted, production hovercraft, such as the LCAC have been sized to accommodate payloads as heavy as 150,000 pounds. In comparison, the first stage of a Titan IIIb launch vehicle is 70 feet long, but weighs only 10,500 pounds empty. Similarly, the planned weight of the Orion space capsule is 19,650 pounds. Therefore, a useful hovercraft ground recovery system may be derived from existing production hardware.

Typical reentry flight hardware is fitted with a parachute sized to provide a ballistic coefficient high enough to reduce the terminal vertical velocity of the flight hardware to a speed of approximately 25 feet per second (or 15 knots). Reentry navigation is sufficiently accurate to provide an error ellipse approximately 3.25 nautical miles long by 2.75 nautical miles wide at the time of main parachute opening. With the main parachute opening at altitudes of approximately 10,000 feet above sea level, the flight hardware will have approximately 400 seconds of descent under the main parachute before touchdown.

Apollo spacecraft recovery wind speeds ranged from calm to 18 knots and the wave height ranged from calm to 6 ft. These conditions approximate those experienced in conditions from sea states 0 through sea state 4. Winds aloft may be stronger yet, with sustained winds of 19 knots and gusts.

In order to affect capture, the hovercraft would be prepositioned in the center of the predicted error ellipse. As the spacecraft maneuvers to enter the atmosphere and while it is entering, it sends its position and velocity information to the hovercraft that updates the landing error ellipse prediction using the telemetry and latest weather, winds, etc. The hovercraft continually maneuvers to the center of the landing error ellipse as the prediction is updated.

Once the parachutes open, the hovercraft moves to intercept the descending space flight hardware. The hovercraft must be able to traverse the distance from its starting point to the spacecraft and then track the motion of the flight hardware as it descends, remaining directly underneath the spacecraft until the spacecraft lands on the hovercraft platform. A typical guided spacecraft would be expected to land within about 3 nautical miles of the predicted landing location. Typical parachute opening altitudes and decent speeds result in about 5 minutes from parachute opening to landing. In this foreseeable scenario, where the parachute opens near the edge of the error ellipse, and prevailing winds blow the flight hardware further off course, the hovercraft would need to attain a mean speed of approximately 45 knots to traverse the 4 nautical miles in order to place itself beneath the flight hardware one minute prior to landing. This sort of mean speed is entirely realistic; current hovercraft have demonstrated peak speeds in excess of 80 knots.

Operationally, two or more hovercraft would be employed in a mission critical scenario in order to provide coverage of vehicles with significantly larger landing error ellipses.

In a reasonable scenario, during the final 60 seconds, the hovercraft would continue to maneuver itself to position itself directly beneath the descending flight hardware. In order to attain precision positioning of the hovercraft to affect capture, it must have a propulsion system to enable the required agility. It is desired that the hovercraft can maneuver in two orthogonal transverse directions at speeds of the same order of magnitude as the expected steady and transient winds (roughly 20 knots).

For example, if the winds are prevailing to the east at 20 knots, the descending flight hardware will be blown eastward at that speed. The hovercraft would need to head east at 20 knots. If there were unsteady gusts blowing alternatively to the north and south, the hovercraft would need to track this transient motion in order to affect capture. Ideally, to obtain this positional authority would not require the vehicle to "steer" in rotation in order to affect translation. Thus, the hovercraft could align itself in heading to capture flight hardware such as slender booster rockets without affecting its positional accuracy. This enables the hovercraft to match the mean and instantaneous surface speed and direction of the descending flight hardware.

Figure 4A:
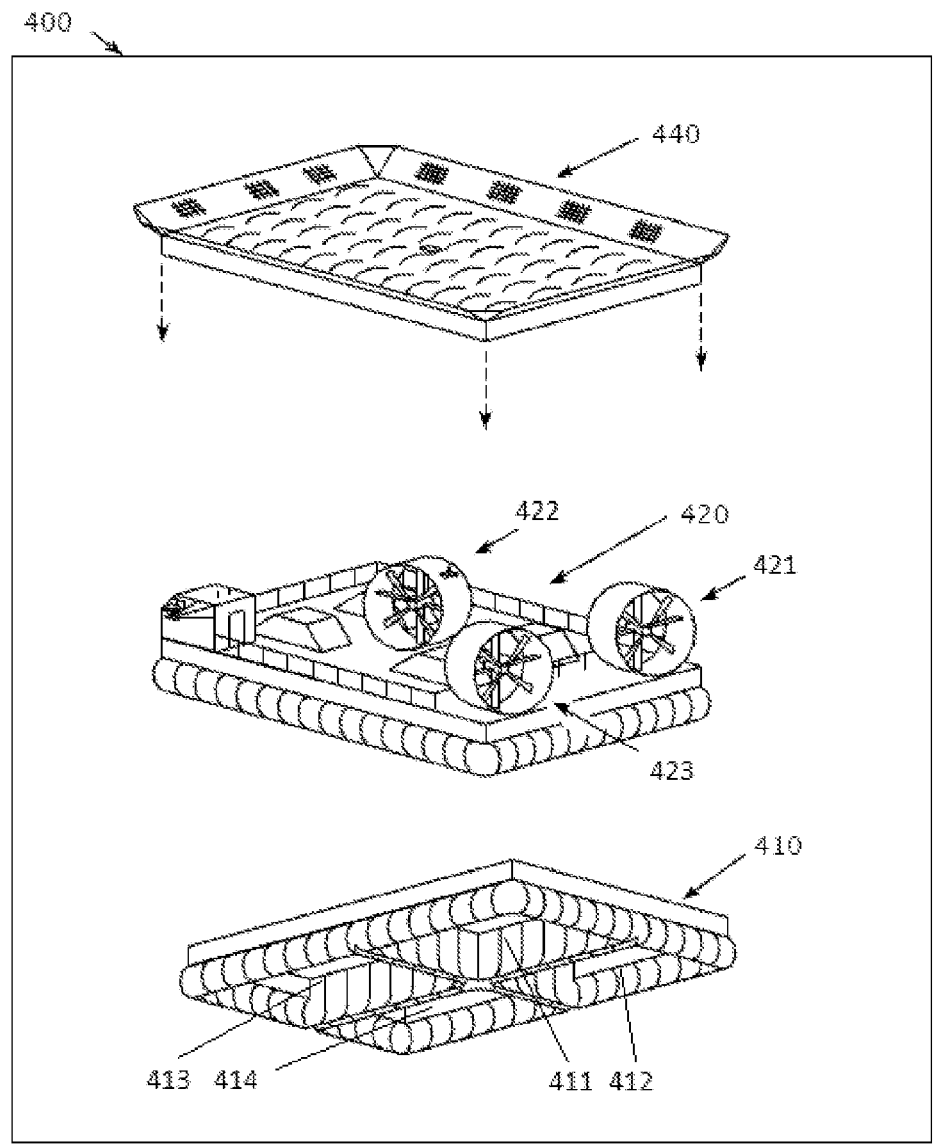
FIG. 4a is a schematic diagram of one embodiment of illustrating the ground based recovery system including flight hardware recovery, propulsion and surface effect skirts.

As shown in FIG. 4A, the hovercraft 400 will have an air cushion surface effect levitation system that will comprise of one or more chambers provided by flexible, pneumatically stabilized diaphragms 410. In an embodiment, the hovercraft air cushion is subdivided into four chambers, 411, 412, 413 and 414. These chambers will be configured to provide roll and pitch stability commensurate with both the expected speed of the hovercraft and the expected impact loading resulting from flight hardware capture. The four chambers will provide additional stability at capture.

The hovercraft propulsion system will be sized to provide the necessary speed, agility and maneuverability for the hovercraft 400 to place itself beneath the descending flight hardware at the time of capture. The overall thrust and its frequency response to modulation will be chosen commensurate with the need of the hovercraft guidance, navigation and control system.

Using a GN&C system comprising elements such as optical 319, RADAR 320 and GPS 321 sub-elements, differential position measurements between the hovercraft and the flight hardware can be determined to the order of a few inches. The feedback control system would modulate the thrust of the various propulsion units in order to ensure minimum relative lateral and transverse motion with respect to the descending flight hardware at the time of capture.

In an embodiment, shown in FIG. 4A, the hovercraft propulsion system 420 will be comprised of three or more propulsion unit fans fixed relative to the hovercraft structure mounted in a manner to permit the hovercraft to maneuver in two orthogonal transverse directions without a need to "steer" in rotation. In one embodiment, the orientation of propulsion units 421, 422 and 423 are essentially orthogonal to one another. Propulsors 421 and 423 provide longitudinal forces, propulsor 422 provides transverse forces. Differential longitudinal forces between propulsors 421 and 423 will provide yawing moments. Modulation of thrust among the various propulsors will provide acceleration to move the hovercraft in any compass direction independently of the compass heading of its front. Modulation of thrust among the various propulsors will rotate the hovercraft so that it may "steer" in rotation in a more conventional manner. Thrust modulation may be attained either by varying the speed or the pitch of fan blades within the propulsor. A constant speed fan with variable pitch blades will offer more rapid thrust modulation than a variable speed fan.

Figure 4B:
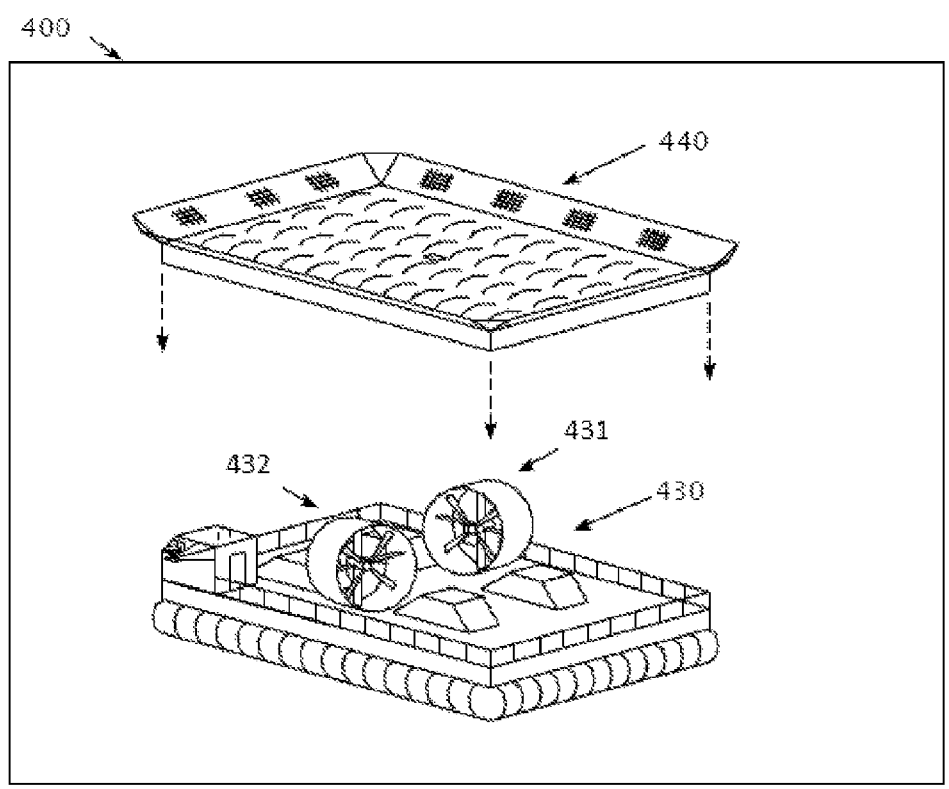
FIG. 4b is a schematic diagram of an alternative embodiment illustrating the ground based recovery system including flight hardware recovery, propulsion and surface effect skirts.

In another embodiment, shown in FIG. 4B, the hovercraft propulsion system 430 will be comprised of one or more vectored thrust propulsion unit fans 431 and 432 mounted in a manner to permit the hovercraft to maneuver in two orthogonal transverse directions with or without a need to "steer" in rotation. Propulsor 431 and 432 can independently vector and modulate thrust. These forces will provide acceleration to move the hovercraft in any compass direction independently of the compass heading of its front. Vectoring and modulation of thrust among the various propulsors will rotate the hovercraft so that it may "steer" in rotation in a more conventional manner. Thrust modulation may be attained either by varying the speed or the pitch of fan blades within the propulsor. Vectoring may be arraigned either by rotating the entire fan assembly, or by fitting air deflectors, ducts or rudders to each fan assembly. A constant speed fan with variable pitch blades will offer more rapid thrust modulation than a variable speed fan. Movable air deflector "rudders" will offer faster response times than a rotating fan assembly.

The landing platform 440, shown in both FIGS. 4A and 4B, will capture the flight hardware without damage or exposure to seawater. The platform 440 may be comprised of one or more embodiments of the invention. In one form of an embodiment, the platform 440 is an inflatable pneumatic surface. In an alternative embodiment, the landing platform 440 is a flexible solid surface. In a third embodiment, the landing platform 440 is a flexible open surface such as a net. Other embodiments may include elements of each type into an overall system.

In one embodiment of the invention, once the space flight hardware has been recovered and secured to the landing platform 440, the hardware and platform may be removed from the hovercraft as a unit, potentially facilitating safe transfer of the hardware to other locations.

The hovercraft 400 must be sized to contain a usable amount of fuel. If the hovercraft is sized to operate from shore-based points, it must have sufficient fuel to travel from its base to the general recovery region and back. In the event that the hovercraft is sized to be compatible with existing amphibious well deck ships, as operated by the US Navy, it may be sized for shorter unrefueled range and operate far from any port. In this scenario, once the hovercraft recovers the flight hardware, it is cocooned inside the amphibious well of the mothership. The recovered flight hardware would be fully protected from the elements.

What is claimed is:

1. A method for capturing reusable space flight hardware that passes through an atmosphere in an approach to a terrestrial surface, the method comprising:
   estimating a trajectory of the space flight hardware as the hardware descends;
   identifying a target landing region on the terrestrial surface that the estimated trajectory will intersect as the hardware approaches the terrestrial surface;
   providing at least one ground based vehicle that is movable and maneuverable and that comprises a hovercraft having a landing platform on which the hardware is to be captured;
   pre-positioning the at least one ground based vehicle in the target landing region so that the estimated trajectory intersects at least a portion of the landing platform;
   providing an atmospheric deceleration system on the space flight hardware;
   activating the deceleration system on the space flight hardware as the hardware approaches the terrestrial surface;
   allowing the space flight hardware to descend in reaction to aerodynamic and gravitational forces acting upon the space flight hardware and the deceleration system;
   measuring relative positions of the space flight hardware and at least one of the landing platform and the ground based vehicle; and
   maneuvering the ground based vehicle using measured relative positions and the estimated trajectory to capture the space flight hardware as the hardware descends to the terrestrial surface.

2. The method of claim 1, wherein said deceleration system comprises a simple parachute.

3. The method of claim 1, wherein said deceleration system comprises a variable ballistic coefficient parachute or parafoil that has limited steering and energy management capability.

4. The method of claim 1, wherein maneuvering said ground based vehicle comprises moving said ground based vehicle in at least two independent directions, drawn from forward direction, rearward direction, leftward direction, rightward direction and rotation about a selected axis that intersects said terrestrial surface.

5. The method of claim 1, further comprising providing a recovery guidance, navigation and control (GN&C) system on said at least one ground based vehicle.

6. The method of claim 5, wherein said GN&C system incorporates measurement of absolute and relative position and velocity information of the space flight hardware and ground based vehicle into its command guidance algorithm.

7. The method of claim 5, wherein said GN&C system enables position guidance information to control the ground based vehicle based upon the estimated trajectory of the space flight hardware.

8. The method of claim 1, wherein maneuvering said ground based vehicle comprises substantially matching the descending flight hardware ground position, ground speed, and ground heading at capture of said space flight hardware.

9. The method of claim 8, wherein said landing platform is oriented to match said descending space flight hardware principal longitudinal axis, aligning the space flight hardware center of mass with the center of the landing platform.

10. The method of claim 1, wherein said space flight hardware is a booster.

11. The method of claim 1, wherein said space flight hardware is a spacecraft.

12. The method of claim 1, wherein said space flight hardware is an engine or equipment pod.

13. A hardware capture system used to capture and recover space flight hardware that passes through an atmosphere in an approach to a terrestrial surface, the system comprising:
   a surface effect levitation system comprising one or more flexible skirts and a pressurization mechanism;
   a landing platform, comprising an energy absorbing open surface that comprises netting, to mechanically receive and capture the space flight hardware;
   a hovercraft propulsion system capable of maneuvering a hovercraft in forward/aft translation, left/right translation and directional rotation (compass heading) independently of each other;
   guidance, navigation and control (GN&C) hardware located on the hovercraft that directs motion of the hovercraft to maneuver itself beneath the descending space flight hardware, to approximately match the space flight hardware speed and direction when the space flight hardware approaches the landing platform.

14. The system of claim 13, wherein said landing platform is comprised of an energy absorbing open surface.

15. The system of claim 14, wherein said energy absorbing open surface comprises netting.

16. The system of claim 13, wherein said propulsion system comprises at least two propulsion units fixed relative to said hovercraft and configured to propel said hovercraft in forward, rearward, leftward and rightward translation, independent of rotation.

17. The system of claim 13, wherein said propulsion system includes at least two vectored thrust propulsion units configured to propel said hovercraft in forward, rearward, leftward and rightward translation, independent of rotation.

18. The system of claim 13, wherein said hovercraft includes an air cushion, the air cushion being subdivided into four or more chambers that are configured to provide roll and pitch stability.

19. A method for capturing reusable space flight hardware that passes through an atmosphere in an approach to a terrestrial surface, the method comprising:
- estimating a trajectory of the space flight hardware as the hardware descends;
- identifying a target landing region on the terrestrial surface that the estimated trajectory will intersect as the hardware approaches the terrestrial surface;
- providing at least one ground based vehicle that is movable and maneuverable and that provides a dry landing platform for the space flight hardware at an ocean landing site;
- pre-positioning the at least one ground based vehicle in the target landing region so that the estimated trajectory intersects at least a portion of the landing platform;
- providing an atmospheric deceleration system on the space flight hardware;
- activating the deceleration system on the space flight hardware as the hardware approaches the terrestrial surface;
- allowing the space flight hardware to descend in reaction to aerodynamic and gravitational forces acting upon the space flight hardware and the deceleration system;
- measuring relative positions of the space flight hardware and at least one of the landing platform and the ground based vehicle;
- maneuvering the ground based vehicle using the measured relative positions and the estimated trajectory to capture the space flight hardware as the hardware descends to the terrestrial surface.

* * * * *